United States Patent
Park et al.

(10) Patent No.: US 10,217,205 B2
(45) Date of Patent: Feb. 26, 2019

(54) GRAIN ANALYZING METHOD AND SYSTEM USING HRTEM IMAGE

(71) Applicants: Min Chul Park, Hwaseong-si (KR); Dae Sin Kim, Hwaseong-si (KR); Sat Byul Kim, Hwaseong-si (KR); Sae Jin Kim, Osan-si (KR); Zhiliang Xia, Hwaseong-si (KR); Je Hyun Lee, Suwon-si (KR)

(72) Inventors: Min Chul Park, Hwaseong-si (KR); Dae Sin Kim, Hwaseong-si (KR); Sat Byul Kim, Hwaseong-si (KR); Sae Jin Kim, Osan-si (KR); Zhiliang Xia, Hwaseong-si (KR); Je Hyun Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 94 days.

(21) Appl. No.: 15/065,901

(22) Filed: Mar. 10, 2016

(65) Prior Publication Data

US 2016/0267643 A1 Sep. 15, 2016

(30) Foreign Application Priority Data

Mar. 10, 2015 (KR) .................. 10-2015-0033437

(51) Int. Cl.
*G06K 9/00* (2006.01)
*G06T 7/00* (2017.01)

(52) U.S. Cl.
CPC .......... *G06T 7/0004* (2013.01); *G06K 9/0014* (2013.01); *G06K 9/00127* (2013.01);
(Continued)

(58) Field of Classification Search
CPC ...... B22F 9/04; B22F 9/007; B22F 2009/041; B22F 3/24
(Continued)

(56) References Cited

U.S. PATENT DOCUMENTS 3,069,654 A 12/1962 Hough et al.
5,917,927 A * 6/1999 Satake .................. G06T 7/0004
356/237.1
(Continued)

FOREIGN PATENT DOCUMENTS

JP 5058913 8/2012
JP 2012202701 10/2012
(Continued)

OTHER PUBLICATIONS

A tool for locat thickness determination and grain boundary charcterization by CTEM and HRTEM techniques. by Kiss et al published on Mar. 2015.*

*Primary Examiner* — Yosef Kassa
(74) *Attorney, Agent, or Firm* — Volentine, Whitt & Francos, PLLC

(57) ABSTRACT

Provided are a method and system for analyzing grains using a high-resolution transmission electron microscopy (HRTEM) image. The method relates to analyzing nanometer grains, and includes receiving an HRTEM image, setting local windows each having a predetermined size for the HRTEM image, performing at least one Fast Fourier transformation on pixel data determined by the local windows to calculate local transformation data; and analyzing grains based on the local transformation data.

20 Claims, 17 Drawing Sheets

(52) U.S. Cl.
CPC ............... *G06T 2207/20056* (2013.01); *G06T 2207/30148* (2013.01)

(58) Field of Classification Search
USPC ....... 382/103, 110, 164, 165, 170, 171, 209, 382/224, 278, 282, 291
See application file for complete search history.

(56) References Cited

U.S. PATENT DOCUMENTS

| | | | | |
|---|---|---|---|---|
| 6,336,051 | B1 * | 1/2002 | Pangels | A01B 79/005 700/207 |
| 6,714,662 | B1 * | 3/2004 | Benson | A01D 41/127 348/113 |
| 6,806,099 | B2 * | 10/2004 | Takeda | C30B 13/00 257/E21.134 |
| 6,882,739 | B2 * | 4/2005 | Kurtz | G01N 23/20 356/30 |
| 6,947,586 | B2 * | 9/2005 | Kasdan | G01N 15/1475 382/133 |
| 7,128,979 | B2 * | 10/2006 | Nagase | H01L 23/3735 428/545 |
| 7,691,463 | B2 * | 4/2010 | Chou | G11B 7/243 428/64.4 |
| 7,938,997 | B2 * | 5/2011 | Zhao | B82Y 30/00 264/125 |
| 7,989,098 | B2 * | 8/2011 | Lai | G11B 5/66 428/832 |
| 8,016,943 | B2 * | 9/2011 | Chan | H01L 39/143 117/84 |
| 8,031,910 | B2 * | 10/2011 | Jones | G01N 15/1475 382/110 |
| 8,043,692 | B2 * | 10/2011 | Zhuk | B32B 15/013 427/255.28 |
| 8,101,409 | B2 * | 1/2012 | Chiu | B82Y 5/00 428/833.2 |
| 8,213,704 | B2 * | 7/2012 | Peterson | G03F 1/84 356/237.4 |
| 8,227,350 | B2 * | 7/2012 | West | B81C 1/0015 257/E21.215 |
| 8,232,559 | B2 * | 7/2012 | West | B81C 1/0015 257/77 |
| 8,392,418 | B2 * | 3/2013 | Birdwell | G06F 17/30442 707/737 |
| 8,613,901 | B2 * | 12/2013 | Lee | B82Y 30/00 117/8 |
| 8,673,810 | B2 * | 3/2014 | Zhao | B01J 21/063 423/610 |
| 8,709,304 | B2 * | 4/2014 | Subramanian | B82Y 30/00 252/582 |
| 8,713,019 | B2 * | 4/2014 | Birdwell | G06F 17/30442 707/737 |
| 2009/0092803 | A1 | 4/2009 | Bita et al. | |
| 2012/0022231 | A1 | 1/2012 | Curmi et al. | |
| 2013/0070277 | A1 | 3/2013 | Hoover et al. | |
| 2013/0115455 | A1 | 5/2013 | Banin et al. | |
| 2013/0189446 | A1 | 7/2013 | Casey et al. | |
| 2014/0158883 | A1 | 6/2014 | Zewail | |

FOREIGN PATENT DOCUMENTS

| | | |
|---|---|---|
| KR | 1130221 | 3/2012 |
| KR | 20130133910 | 11/2013 |

* cited by examiner

| Pixel | Amplitude | Angle | Period |
|---|---|---|---|
| P[1][1] | AP11 | AG11 | PR11 |
| P[1][2] | AP12 | AG12 | PR12 |
| P[1][3] | AP13 | AG13 | PR13 |
| ⋮ | ⋮ | ⋮ | ⋮ |
| P[1][N] | AP1N | AG1N | PR1N |
| P[2][1] | AP21 | AG21 | PR21 |
| ⋮ | ⋮ | ⋮ | ⋮ |
| P[M][N] | APMN | AGMN | PRMN |

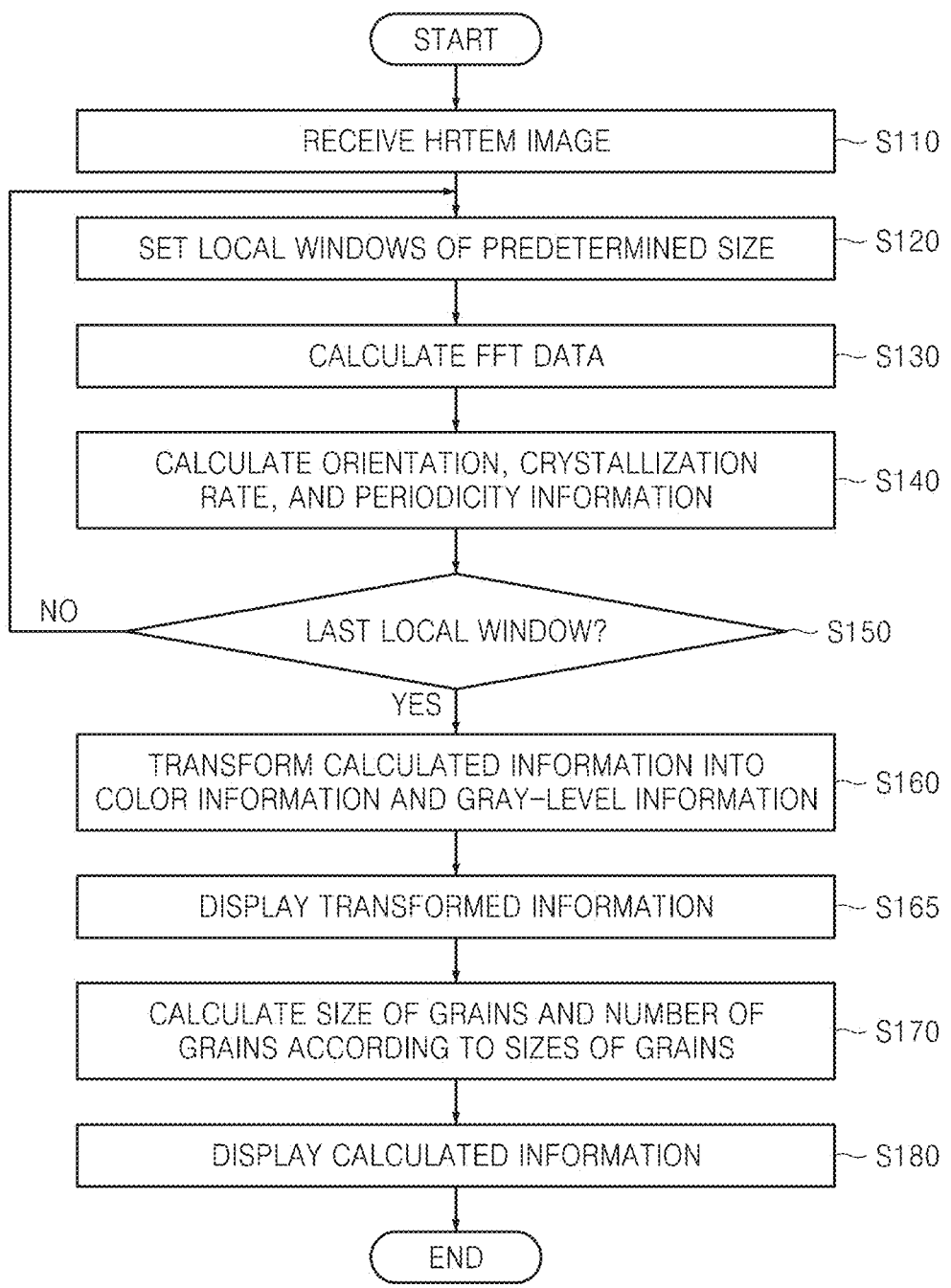

GRAIN ANALYZING METHOD AND SYSTEM USING HRTEM IMAGE

CROSS-REFERENCE TO RELATED APPLICATION

This application claims the benefit of Korean Patent Application No. 10-2015-0033437 filed on Mar. 10, 2015, the subject matter of which is hereby incorporated by reference.

BACKGROUND

Embodiments of the inventive concept relate to grain analyzing methods and systems. More particularly, embodiments of the inventive concept relate to methods and systems analyzing one or more nanometer-sized grain(s) using a high-resolution transmission electron microscopy (HRTEM) image.

Contemporary grain measuring methods are performed using scanning electron microscopy (SEM), scanning transmission electron microscopy (STEM), or electron backscatter diffraction (EBSD). However, nanometer (nm) sized grains cannot be accurately measured using these techniques, whereas nanometer sized grains can be measured using HRTEM. Unfortunately, it currently requires an unacceptably long time to analyze an HRTEM image. Further, it is practically impossible to quantize results derived from analyzing an HRTEM image.

SUMMARY

According to an aspect of the inventive concept, there is provided a grain analyzing method of analyzing a nanometer-sized grain.

The grain analyzing method includes receiving a high-resolution transmission electron microscopy (HRTEM) image; setting a local window for the HRTEM image to define pixel data; performing at least one Fast Fourier Transformation (FFT) on the pixel data to calculate local transformation data; and analyzing the grain based on the local transformation data.

The performing of the FFT may include performing a two-dimensional (2D) Digital Fourier Transform (DFT) on the pixel data.

The analyzing of the grains may include calculating at least one of orientation information, crystallization rate information, and periodicity information for the grain.

The calculating of at least one of the orientation information, crystallization rate information, and periodicity information for the grain may include selecting data having a maximum amplitude from the local transformation data; calculating the orientation information based on a direction of the selected data from a midpoint; and calculating the periodicity information based on a distance between the midpoint and the selected data.

The analyzing of the grain may further include determining whether the grain is a crystalline material or an amorphous material based on the periodicity information.

According to another aspect of the inventive concept, a method of analyzing nanometer-sized grains including a first grain and a second grain, the method includes calculating grain analysis data for each pixel of a high-resolution transmission electron microscopy (HRTEM) image; and segmenting the first grain and the second grain based on the grain analysis data. The grain analysis data includes at least one of orientation information, crystallization rate information, and periodicity information for the first grain and the second grain.

The calculating of the grain analysis data may include calculating Fast Fourier Transformation (FFT) data by performing at least one FFT on pixel data of the HRTEM image to generate FFT data; and calculating the at least one of orientation information, crystallization rate information, and periodicity information for each pixel of the pixel data based on the FFT data.

The segmenting of the first grain and the second grain may further include selecting a first pixel having a highest crystallization rate based on the grain analysis data for each pixel of pixel data of the HRTEM image; determining whether pixels adjacent to the first pixel are of the same material; determining whether pixels of the same material among the pixels adjacent to the first pixel belong to the same grain as the first pixel; and setting a border of the first grain including the adjacent pixels belonging to the same grain as the first pixel.

The determining of whether pixels adjacent to the first pixel are of the same material may include determining whether the first pixel and the pixels adjacent to the first pixel are crystalline material or amorphous material, based on the periodicity information.

According to another aspect of the inventive concept, there is provided a system for analyzing nanometer-sized grains.

The system includes a high-resolution transmission electron microscopy (HRTEM) image analyzing apparatus configured to receive an input image (IIM) for the HRTEM image, divide the IIM into local windows, perform at least one Fast Fourier Transformation (FFT) on pixel data selected by the local windows to obtain FFT data to generate local transformation data, analyze grains based on the local transformation data to generate grain analysis data, and generate an output image (OIM) derived from the grain analysis data; and a display device configured to display at least one image in response to the OIM.

The image analyzing apparatus may include a local window setting unit configured to set the local windows for a frame of the IIM; an FFT processor configured to calculate the local transformation data by performing two-dimensional (2D) FFT on pixel data respectively determined by the local windows; and an analyzing unit configured to calculate orientation information, crystallization rate information, and periodicity information for grains associated with each one of the local windows based on the local transformation data.

The analyzing unit may select pixel data having a maximum amplitude from the local transformation data, calculate the orientation information based on a direction of the selected pixel data from a midpoint, and calculate the periodicity information based on a distance between the midpoint and the selected data.

The analyzing unit may determine whether the grains are crystalline material or amorphous material based on the periodicity information, and determine whether the grains are the same material based on the orientation information.

The analyzing unit may correlates orientation information, crystallization rate information, and periodicity information for each of the grains in relation to pixel data of at least one the local windows.

According to another aspect of the inventive concept, a system for analyzing nanometer-sized grains includes a memory configured to store program codes; and a processor configured to execute the program codes. The program codes include a Fast Fourier Transformation (FFT) processing code that performs at least one FFT on data contained in an input image (IIM) derived from a high-resolution transmission electron microscopy (HRTEM) image to generate FFT data, wherein the IIM is divided into a plurality of local windows; and an analysis code that calculates at least one of orientation information, crystallization rate information, and periodicity information for each of grains based on the FFT data.

The processor may calculate the FFT data by performing at least one two-dimensional (2D) FFT on pixel data derived from the plurality of pixels, as divided among the plurality of local windows, and store the 1-FT data in the memory.

The local FFT data may include amplitude data two-dimensionally arranged around a midpoint. The processor may calculate the at least one of the orientation information, crystallization rate information, and periodicity information based on the FFT data, and store the at least one of the orientation information, crystallization rate information, and periodicity information in the memory.

BRIEF DESCRIPTION OF THE DRAWINGS

Embodiments of the inventive concept will be more clearly understood from the following detailed description taken in conjunction with the accompanying drawings in which:

FIGS. 4 and 5 are conceptual diagrams that illustrate local windows according to embodiments of the inventive concept;

FIG. 6B is a table listing orientation information, crystallization rate, and periodicity information for a grain as calculated on a pixel by pixel basis;

FIG. 7 is a flowchart summarizing a grain analyzing method according to an embodiment of the inventive concept;

DETAILED DESCRIPTION

The inventive concept will now be described in some additional detail with reference to the accompanying drawings. The inventive concept may, however, be embodied in many different forms and should not be construed as being limited to only the embodiments set forth herein. Rather, these embodiments are provided so that this disclosure will be thorough and complete, and will fully convey the scope of the invention to those skilled in the art. Throughout the written description and drawings, like reference numbers and labels are used to denote like or similar elements and features.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 1:
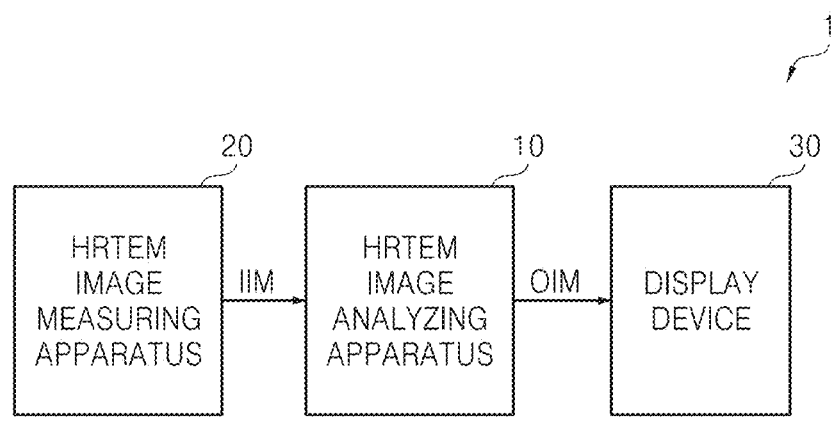
FIG. 1 is a general block diagram illustrating a grain analyzing system according to an embodiment of the inventive concept.

FIG. 1 is a block diagram of a grain analyzing system 1 according to an embodiment of the inventive concept. Referring to FIG. 1, the grain analyzing system 1 generally includes an image analyzing apparatus 10, an image measuring apparatus 20, and a display device 30.

The image measuring apparatus 20 measures a high-resolution transmission electron microscopy (HRTEM) image taken of a material (e.g., polysilicon, a metal, etc.) including granular materials feature(s), hereafter generically referred to as grain(s). In practice, the image measuring apparatus 20 captures an image of target material and generates an HRTEM image according to a defined format. Many different custom or standardized image formats may be used to generate an input image (IIM) provided from the HRTEM image measuring apparatus 20. This IIM may be provided in the form of image file, such as a jpg file, a gif file, a tiff file, a bmp file, etc.

In this exemplary approach, the image analyzing apparatus 10 may differentiate (or divide) target material according to a grain region (i.e., a crystalline-material region) and a non-grain region (i.e., an amorphous-material region). This region differentiation may be performed, for example, using Fast Fourier Transformation(s) (FFT) of the HRTEM image IIM to obtain workable data. Then, the resulting FFT data may be further processed to calculate orientation information, periodicity information, and/or crystallization rate information for a particular grain. This approach may be applied to any number of grains depending on the extent of the ongoing analysis.

From the foregoing it may be understood that a "grain" might alternately be referred to as a crystalline grain or a crystalline material region in contrast to proximate "non-grain" material, such as amorphous material. Certain embodiments of the inventive concept are particularly well suited to the measurement, analysis, and/or characterization of nanometer-sized grains. Here, the term "nanometer-sized grains" is used to denote grains having at least one physical dimension measured in nanometers.

In addition, the image analyzing apparatus 10 may separate (or segment) grains and calculate grain size(s) by, for example, detecting a border between the grains having different orientations.

The image analyzing apparatus 10 may also be used to transform information obtained from the FFT data (or related data) derived from the HRTEM image. Thus, color information (e.g., RGB data) and gray-level information (e.g., brightness data) may be derived in order to generate corresponding display information. As a result, the image analyzing apparatus 10 may provide the display device 30 with an output image (OIM) that is capable of being transformed into color information and gray-level information, for example.

The display device 30 receives the resulting OIM and displays images corresponding to the constituent color information and gray-level information, for example.

Figure 2:
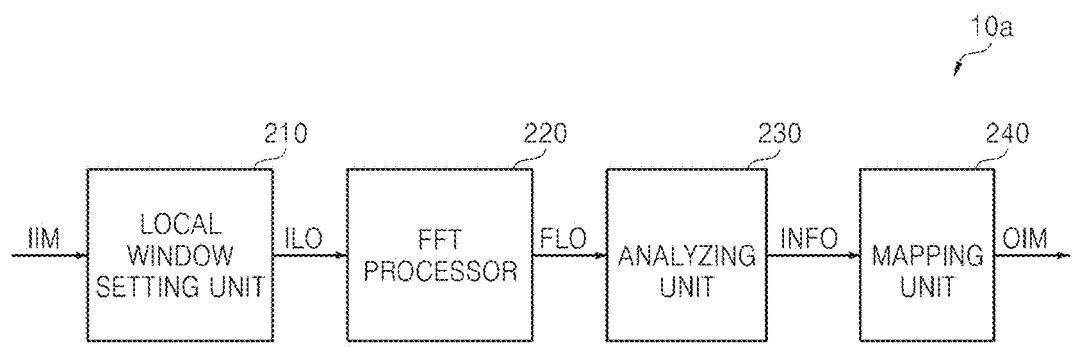
FIGS. 2 and 3 are respective block diagrams further illustrating in different examples the HRTEM image measuring apparatus of FIG. 1 according to embodiments of the inventive concept.

FIG. 2 is a block diagram further illustrating in one example (10a) the image analyzing apparatus 10 of FIG. 1 according to an embodiment of the inventive concept. Referring to FIGS. 1 and 2, the image analyzing apparatus 10a includes a local window setting unit 210, a FFT processor 220, an analyzing unit 230, and a mapping unit 240.

The local window setting unit 210 divides the received IIM into predetermined-sized local windows. For example, assuming that one frame of the IIM consists of (M×N) pixels, each one of a number of local windows may be set to include a certain number (K×L) of the total number of pixels in the frame. Here, 'M', 'N', 'K', and 'L' are natural numbers, where K is less than M and L is less than N. Thus, the local window setting unit 210 may sequentially define (or 'set') a plurality of local windows while scanning data corresponding to a frame of the IIM.

According to the nomenclature used in relation to FIG. 2, each of local window ('ILO') generated by the local window setting unit 210 is subsequently (e.g., sequentially) provided to the FFT processor 220 where each of local window ILO is converted into corresponding local transformation data ('FLO'). Thereafter, the local transformation data FLO is converted into grain analysis data ('INFO') by the analyzing unit 230, and the resulting grain analysis data INFO is provided to a mapping unit 240 that generates the output image OIM (or mapped output data).

Figure 4:
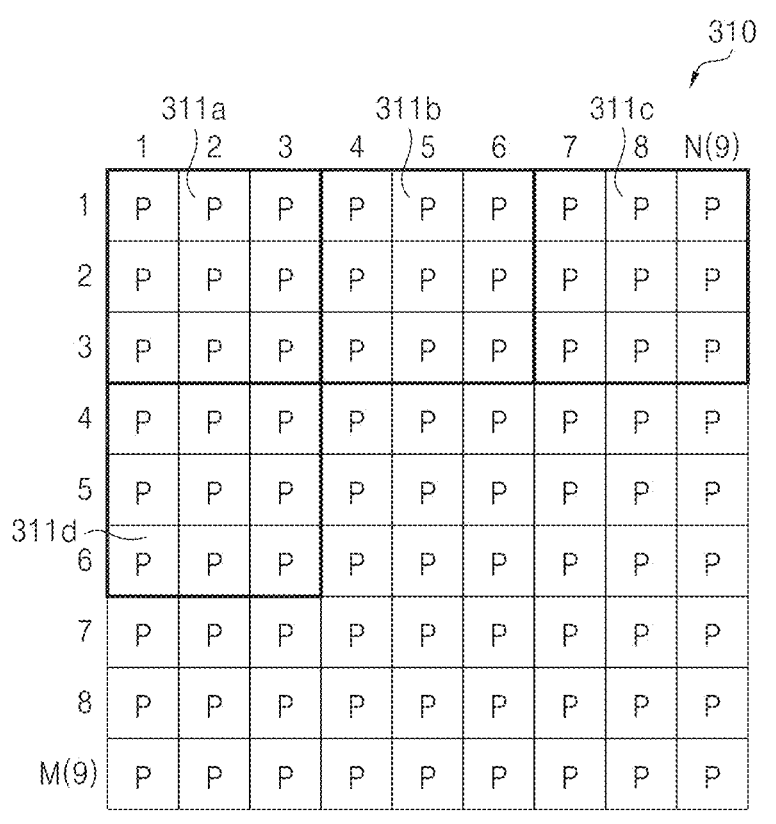
Figure 5:
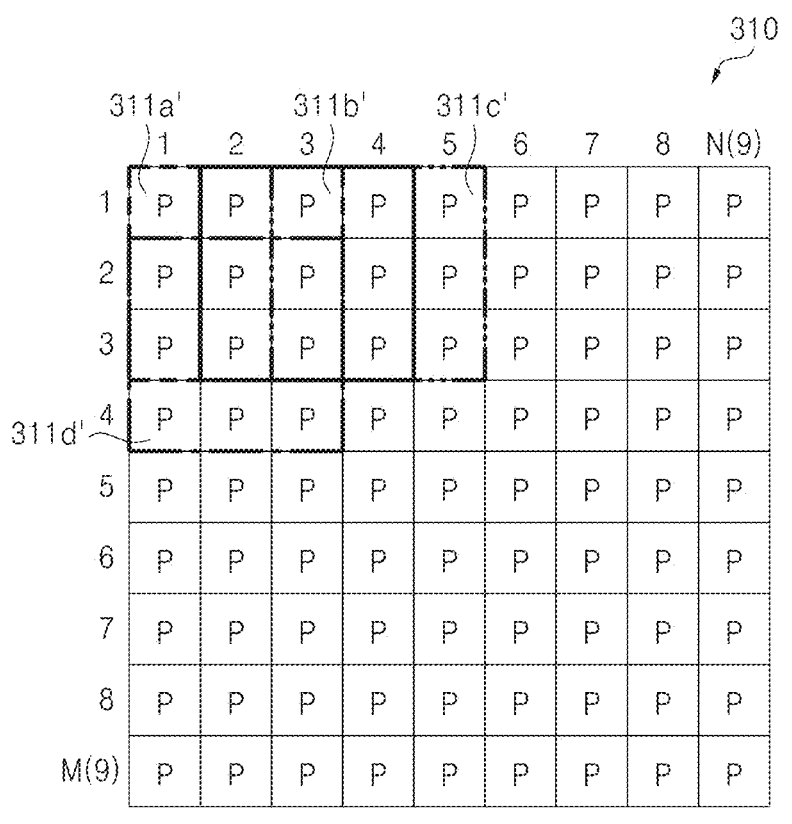

FIGS. 4 and 5 variously illustrate the use of local windows in certain embodiments of the inventive concept.

Referring to FIGS. 4 and 5, one (M×N) frame 310 of an HRTEM image IIM is assumed to include a number of (K×L) local windows 311a, 311b, 311c, and 311d. Here, 'K' and may have the same value (e.g., 16×16, or 8×8), or may be different values (e.g., 12×16, or 6×8). For convenience of explanation in relation to FIGS. 4 and 5, it is assumed that both 'K' and 'L' are 3, and both 'M' and 'N' are 9. In FIGS. 4 and 5, the symbol 'P' denotes pixel data. Thus, the exemplary frame 310 illustrated in FIGS. 4 and 5 consists of (M×N) pixel data ranging from P[1][1] to P[M][N]. Thus, respective pixel data may be identified as "P[i][j]", where 'i' denotes a row (i.e., a horizontal line) ranging from 1 to M rows and 'j' denotes a column (i.e., a vertical line) ranging from 1 to N columns.

In certain embodiments of the inventive concept, the local window setting unit 210 sequentially sets (or positions) each one of a plurality of local windows with respect to the frame 310. IN FIG. 4, it is assumed that each one of local windows 311a, 311b, 311c and 311d is set while data is being scanned from left to right. As may be seen from FIG. 4, the plurality of local windows may be set such that respective local windows do not overlap. However, this need not always be the case as illustrated by the example of FIG. 5

In the embodiment of FIG. 4, the first local window 311a includes pixel data P[1][1], P[1][2], P[1][3], P[2][1], P[2][2], P[2][3], P[3][1], P[3][2], and P[3][3], the second local window 311b includes pixel data P[1][4], P[1][5], P[1][6], P[2][4], P[2][5], P[2][6], P[3][4], P[3][5], and P[3][6], and so on. In the embodiment of FIG. 5, each of local windows 311a', 311b', 311c', and 311d' partially overlaps at least one other local window. So, in the embodiment of FIG. 5, the first local window 311a' includes pixel data P[1][1], P[1][2], P[1][3], P[2][1], P[2][2], P[2][3], P[3][1], P[3][2] and P[3][3], the second local window 311b' includes pixel data P[1][2], P[1][3], P[1][4], P[2][2], P[2][3], P[2][4], P[3][2], P[3][3], and P[3][4], and so on.

Referring back to FIG. 2 in the context of FIGS. 4 and 5, the FFT processor 220 calculates the local transformation data FLO (e.g., two dimensional (2D) FFT data) by performing a 2D FFT on data of each of the local windows ILO (e.g., K×L pixels). The 2D FFT data may include, for example, amplitude data that are two-dimensionally arranged around a midpoint. This particular example will be described in some further detail hereafter.

Thereafter, the analyzing unit 230 analyzes grains based on the local transformation data FLO. In one embodiment of the inventive concept, the analyzing unit 230 is used to calculate three (3) types of information (e.g., orientation information, crystallization rate information, and periodicity information) for each grain with respect to each of the local windows, based on the sequentially provided local transformation data FLO. Here, the orientation information for each grain may be expressed as a direction angle, while the crystallization rate information may be expressed as an amplitude.

In one embodiment, the analyzing unit 230 may delete data that fails to rise to a given threshold among FLO (e.g., 2D FFT data) before calculating the orientation, crystallization rate, and periodicity information. In certain embodiments, the analyzing unit 230 may calculate the orientation, crystallization rate, and periodicity information for each grain by using only data corresponding to a maximum value (e.g., a maximum amplitude) included in the FLO. A memory, table, register or similar data storage medium may be used in relation to the analyzing unit 230 may store the orientation information, crystallization rate information, and/or periodicity information for each grain, as calculated in relation to each local window to correspond to at least one pixel of the corresponding local window.

Figure 6A:
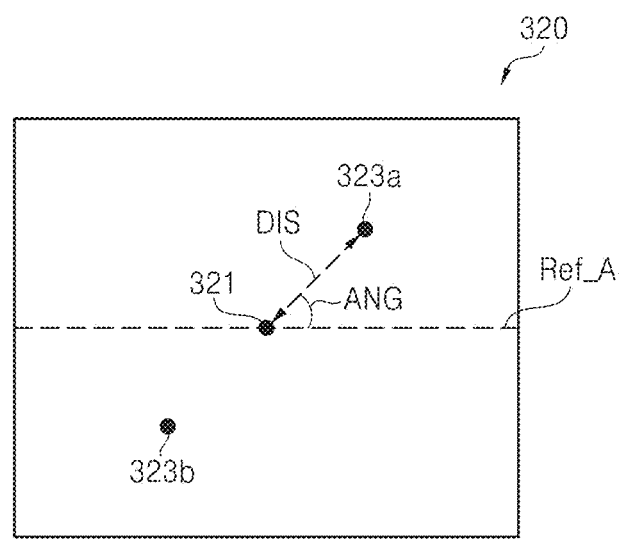
FIG. 6A is a conceptual diagram illustrating a method of calculating orientation information, crystallization rate, and periodicity information for a grain based on two-dimensional (2D) Fast Fourier Transformation (FFT) data.

FIG. 6A is a conceptual diagram illustrating a method of calculating orientation information, crystallization rate information, and periodicity information for a grain. This example assumes the use of 2D FFT data in which data 323a and 323b—each having a maximum amplitude—among 2D FFT data calculated for one local window illustrated in FIGS. 4 and 5.

Referring to FIG. 6A, the data 323a and 323b each having the maximum amplitude may be displayed as points that are symmetrical to a midpoint 321. For convenience of explanation, the data 323a and 323b will be referred to as maximum points 323a and 323b.

A method of calculating information regarding a grain using one maximum point 323a will now be described. However, the information regarding the grain may be calculated using the other maximum point 323b which is symmetrical to the maximum point 323a. The analyzing unit 230 may obtain crystallization rate information for a grain from a value of the maximum point 323a (i.e., the maximum amplitude). The analyzing unit 230 may calculate a direction angle by calculating an angle between a line connecting the midpoint 321 and the maximum point 323a and a reference line (Ref_A). The analyzing unit 230 may obtain periodicity information for the grain by calculating a distance (DIS) between the midpoint 321 and the maximum point 323a.

In certain embodiments of the inventive concept, the analyzing unit 230 may differentiate a grain (i.e., crystalline material) from non-grain material (i.e., an amorphous material) based on the periodicity information, and/or separate (or differentiate) two or more different grains from crystalline material based on the periodicity information. This ability results from the characteristic that crystalline grains have periodicities that fall within an expected range.

Thus, the analyzing unit 230 may classify a grain as a crystalline grain when the periodicity information of the grain falls within a predefined specific range (e.g., when the distance DIS between the midpoint 321 and the maximum point 323a falls within in a specific range), or classify the grain as an amorphous material when its periodicity information falls outside the expected range. Thus, when respective periodicity ranges for two or more different grains are defined beforehand, the analyzing unit 230 may compare the periodicity information for crystalline material with the periodicity range and divide the crystalline material into two or more different grains accordingly.

In one embodiment, the analyzing unit 230 may differentiate grain and non-grain material based on the crystallization rate information, and/or differentiate crystalline material into two or more different grains based on crystallization rate information for the crystalline material.

Here again, a grain may have a crystallization rate that falls within an expected range. For example, a crystallization rate range may be defined and stored beforehand, and the analyzing unit 230 may compare the crystallization rate for a pixel with the stored crystallization rate information in order to determine whether material of a pixel is grain or non-grain.

In certain embodiments of the inventive concept, the analyzing unit 230 may differentiate grain from non-grain based on both periodicity and crystallization rate information. For example, the analyzing unit 230 may determine that the material of a local window is a grain when periodicity information calculated from FFT data associated with the local window falls within a first range, and/or crystallization rate information calculated from FFT data associated with the local window falls within a second range.

The analyzing unit 230 may determine whether grains have the same orientation based on direction angle information. For example, the analyzing unit 230 may determine that grains have the same orientation (and therefore that the grains are the same material) when the corresponding direction angle information is less than or equal to an angle threshold (e.g., 3°, 5° or 7°, etc.).

As described above, the analyzing unit 230 may calculate grain analysis data INFO (e.g., orientation information, periodicity information, and/or crystallization rate information) for a grain of each local window or each pixel based corresponding FLO (e.g., FFT data). The grain analysis data INFO may be stored in a memory associated with the HRTEM image measuring apparatus 10 of FIG. 1.

An example of the grain analysis data INFO (i.e., orientation information, crystallization rate information, and/or periodicity information) calculated by the analyzing unit 230 is illustrated in FIG. 6B. Referring to FIG. 6B, a local window—such as the ones illustrated in FIGS. 4 and 5—may be set for each of the pixels P[1] [1] to P[M][N] included in frame data. One or more FFTs may be performed on pixel data of the local window to obtain FFT data, and then an amplitude $AP_{ij}$, a direction angle $AG_{ij}$, and periodicity $PR_{ij}$ may be calculated based on the FFT data as described above with reference to FIG. 6A. Grain analysis data INFO for each pixel illustrated in FIG. 6B may be stored in a memory in a multi-array form.

The mapping unit 240 may then map the grain analysis data INFO output from the analyzing unit 230 to data to be displayed. In certain embodiments of the inventive concept, the mapping unit 240 may map orientation information of a grain to color information and crystallization rate information of the grain to gray-level information (e.g., brightness information), but embodiments of the inventive concept are not limited thereto. The mapping unit 240 may then communicate mapped output data OIM data to the display device 30.

Figure 3:
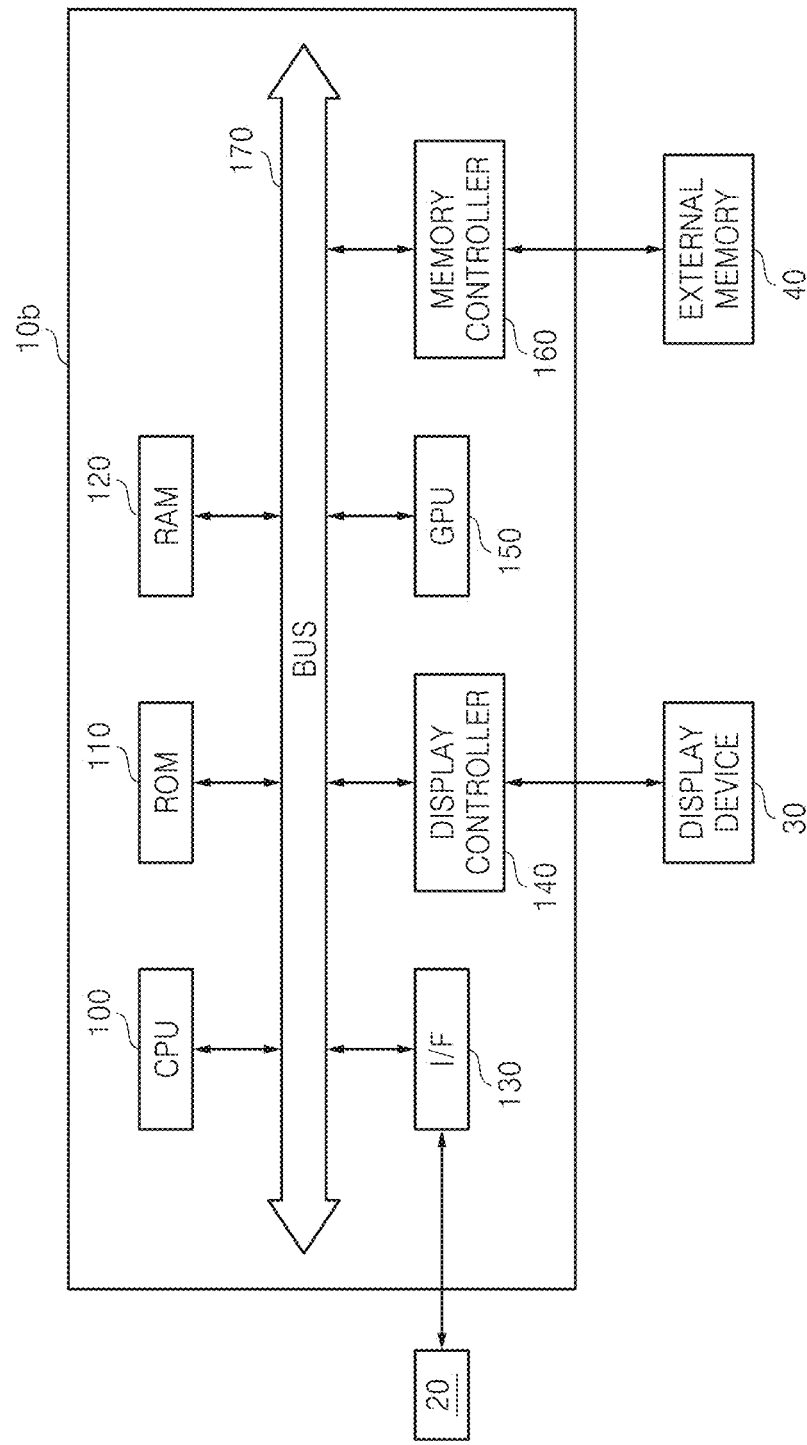

FIG. 3 is a block diagram further illustrating in another example (10b) the image analyzing apparatus 10 of FIG. 1 according to another embodiment of the inventive concept.

Referring to FIG. 3, the image analyzing apparatus 10b may be embodied as a computer (e.g., a personal computer (PC), a tablet computer, a personal digital assistant (PDA), or the like).

The image analyzing apparatus 10b illustrated in FIG. 3 includes a central processing unit (CPU) 100, a read-only memory (ROM) 110, a random access memory (RAM) 120, an interface (I/F) unit 130, a display controller 140, a graphics processing unit (GPU) 150, a memory controller 160, and a bus 170.

The CPU 100 which may be also referred to as a processor may process or execute programs and/or data stored in the memory 110, 120, or 40. For example, the CPU 100 may process or execute the programs and/or the data according to a clock signal output from a clock signal generator (not shown).

In one embodiment, the CPU 100 may be embodied as a multi-core processor. The multi-core processor may be one computing component with two or more independent substantial processors (which are referred to as 'cores'). Each of these processors may read and execute program instructions. The multi-core processor is capable of simultaneously driving a plurality of accelerators and thus a data processing system including the multi-core processor may perform multi-acceleration.

Programs and/or the data stored in the ROM 110, the RAM 120, and the memory device 40 may be loaded to a memory of the CPU 100 if necessary.

The ROM 110 may store permanent programs and/or data. The ROM 110 may be embodied as an erasable programmable read-only memory (EPROM) or an electrically erasable programmable read-only memory (EEPROM).

The local window setting unit 210, the 1-FT processor 220, the analyzing unit 230, and the mapping unit 240 of FIG. 2 may be embodied as codes (e.g., ROM codes) that may be executed by the CPU 100 and stored in the ROM 110. The RAM 120 may temporarily store programs, data, or instructions. For example, programs and/or data stored in the memory device 40 may be temporarily stored in the RAM 120 under control of the CPU 100 or according to booting code stored in the ROM 110. According to an embodiment, the RAM 120 may be embodied as a dynamic RAM (DRAM) or a static RAM (SRAM).

The local window setting unit 210, the FFT processor 220, the analyzing unit 230, and the mapping unit 240 of FIG. 2 may be embodied as software (e.g., application software) that may be executed by the CPU 100 and stored in the memory device 40.

The I/F unit 130 is configured to interface with the image measuring apparatus 20. For example, the I/F unit 130 may receive an HRTEM image IIM from the image measuring apparatus 20 and stores it in the memory 40 or 120 via the memory controller 160.

Program code that the CPU 100 may execute may include FFT processing code, analysis code, and mapping code. The CPU 100 may execute the FFT processing code to read an HRTEM image IIM from the memory device 40 in units of local windows, and perform 2D FFT in units of the local windows to calculate local transformation data FLO. Also, the CPU 100 may execute the analysis code to analyze a grain based on 2D FFT data calculated using the FFT processing code, i.e., the local transformation data FLO, to calculate grain analysis data INFO described above, and store the grain analysis data INFO in the memory 40 or 120.

The grain analysis data INFO may include orientation information, crystallization rate information, and/or periodicity information for each pixel as illustrated in FIG. 6B.

Also, the CPU 100 may classify material of the plurality of pixels based on at least one of the crystallization rate and periodicity information for each of the plurality of pixels and classify grains based on orientation information of each of the plurality of pixels so as to calculate grain classification data, and store the grain classification data in the memory 40 or 120. The CPU 100 may classify grains according to an embodiment of FIG. 15 which will be described below.

The grain classification data may include information regarding pixels belonging to each of a plurality of grains classified as different grains, e.g., the coordinates of the pixels.

For example, if it assumed that three grains are classified as different grains, the grain classification data may include information regarding pixels belonging to a first grain, information regarding pixels belonging to a second grain, and information regarding pixels belonging to a third grain among the three grains.

Also, the grain classification data may further include a representative crystallization rate, orientation, and periodicity information for each grain.

In one embodiment, the representative crystallization rate of each grain is a maximum amplitude of the grain, the representative orientation information is a direction angle of a pixel having the maximum amplitude of the grain, and the representative periodicity information is periodicity information of the pixel having the maximum amplitude of the grain.

The CPU 100 may execute the mapping code to map the grain analysis data INFO of FIG. 2 to data OIM to be displayed and store the mapped data OIM of FIG. 2 in the memory 40 or 120.

For example, the CPU 100 may execute the mapping code to respectively convert orientation information and a crystallization rate information included in the grain analysis data INFO into color information and brightness information, but embodiments of the inventive concept are not limited thereto. For example, mapped information may vary, and the periodicity information may be mapped to the color information or the brightness information.

The GPU 150 processes data, which is read from the memory device 40 by the memory controller 160, to be a signal to be displayed.

For example, the GPU 150 may read the mapped data OIM of FIG. 2 from the memory device 40 and processes it to be a signal to be displayed.

The memory controller 160 is a block configured to interface with the memory device 40. The memory controller 160 controls overall operations of the memory device 40 and controls exchange of various types of data between a host and the memory device 40. For example, the memory controller 160 writes data to or reads data from the memory device 40, in response to a request from the host.

Here, the host may be a processing unit such as the CPU 100, the GPU 150, or the display controller 140.

The memory device 40 is a place configured to store data, and may store an operating system (OS), various programs, and various types of data. The memory device 40 may be a DRAM but is not limited thereto. For example, the memory device 40 may be a nonvolatile memory device, e.g., a flash memory, a phase-change RAM (PRAM), a magneto-resistive RAM (MRAM), a resistive RAM (ReRAM), or a ferroelectric RAM (FeRAM) device. Also, the memory device 40 may be an internal memory installed in the image analyzing apparatus 10b.

The components 100, 110, 120, 130, 140, 150, and 160 may communicate with one another via the bus 170.

The display device 30 may display an output image signal output from the display controller 140. The display device 30 may be embodied as a liquid crystal display (LCD), a light-emitting diode (LED), an organic LED (OLED), or an active-matrix OGLED (AMOLED) device.

The display controller 140 may read the mapped data OIM of FIG. 2 from the memory device 40 and display it on the display device 30.

FIG. 7 is a flowchart summarizing a grain analyzing method according to an embodiment of the inventive concept. The grain analyzing method of FIG. 7 may be performed by an image analyzing apparatus like the ones previously described in relation to FIGS. 2 and 3 (10a and 10b). FIGS. 8 to 12 are image diagrams further illustrating the grain analyzing method of FIG. 7.

Figure 8:
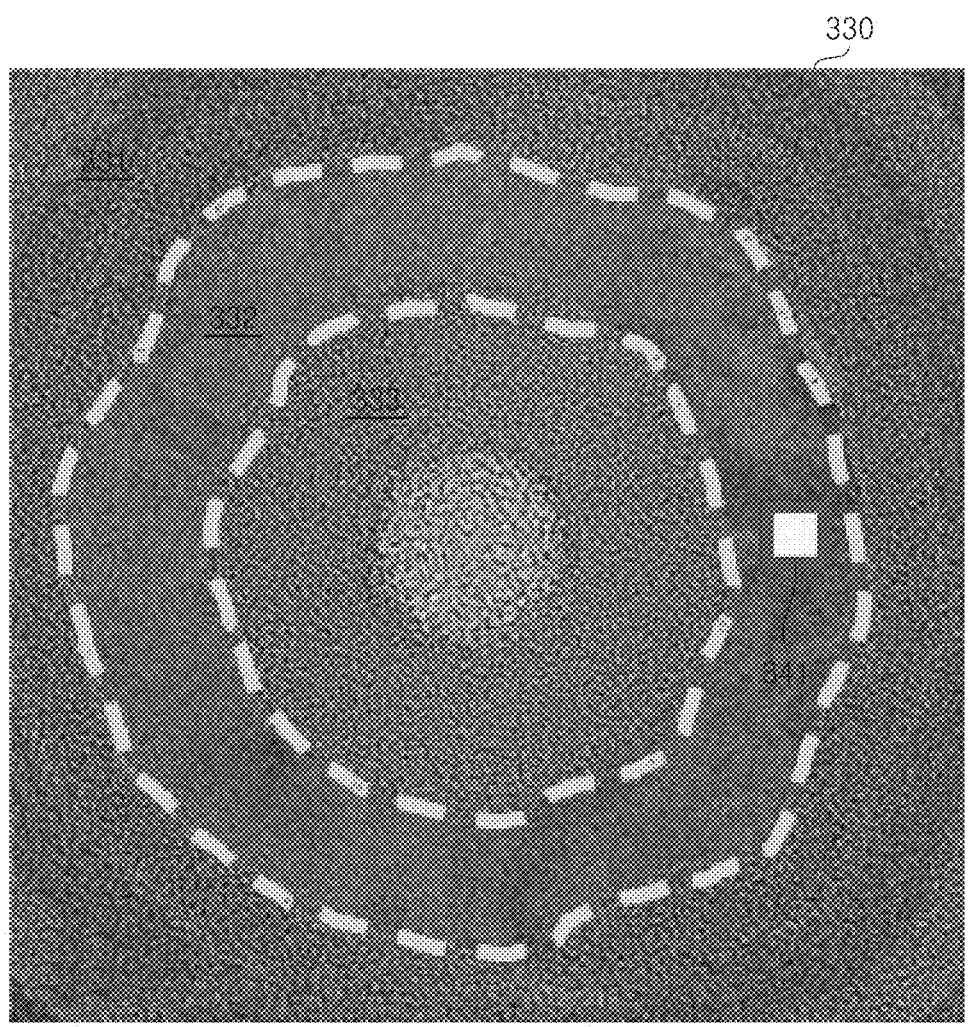
FIGS. 8, 9, 10, 11 and 12 (inclusively, FIGS. 8-12) are respective images and image portions further illustrating the grain analyzing method of FIG. 7.

Referring to FIGS. 7 to 12, the image analyzing apparatus 10a or 10b receives an HRTEM image (operation S110). An example of an HRTEM image 330 of one frame is illustrated in FIG. 8.

Figure 9:
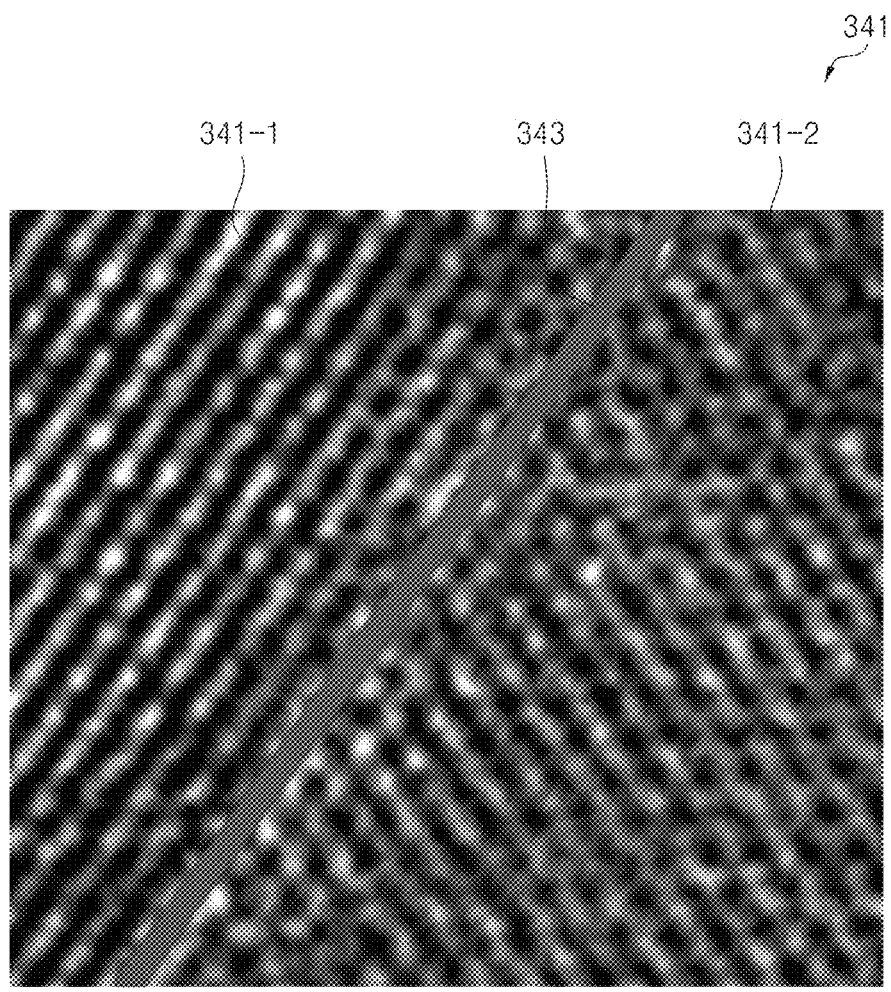
Figure 10:
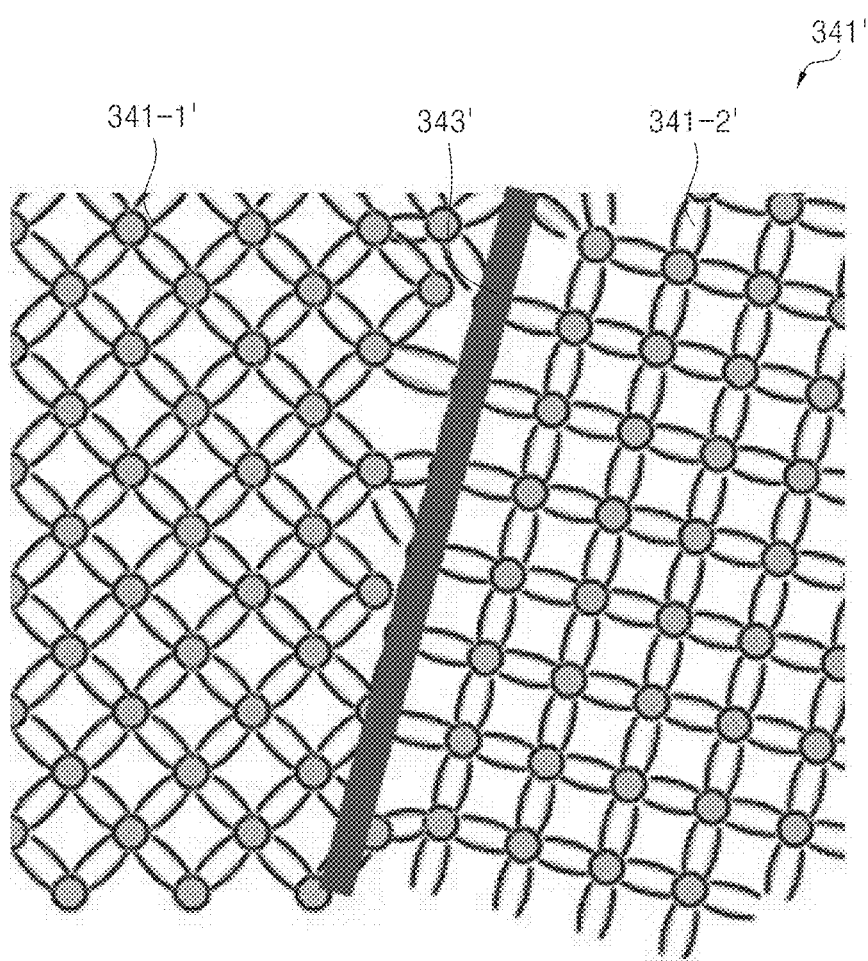

FIG. 8 illustrates an example of an image of a polysilicon channel of a vertical NAND (VNAND) flash memory, which is captured by HRTEM. FIG. 9 illustrates a result of enlarging an image of a partial region 341 of FIG. 8. FIG. 10 illustrates a result of simplifying and modeling the image of FIG. 9.

Referring to FIGS. 8 to 10, the frame image 330 includes different material regions 331, 332, and 333. For example, the material region 332 may be a polycrystalline material region, e.g., a polysilicon region, and the material region 331 and the material region 333 may be amorphous material regions.

The partial region 341 includes a first grain 341-1 and a second grain 341-2 which are different grains. In the case of first grain 341-1' and a second grain 341-2' which are simply modeled, directions in which they are arranged are different from each other.

Thus, a grain boundary 343 is present between the first grain 341-1 and the second grain 341-2, and a grain boundary 343' is present between the first grain 341-1' and the second grain 341-2'.

Here, the term "grain boundary" means a border between two differently oriented grains of a polycrystalline material. When the orientations of materials are the same, i.e., when the materials are oriented in the same direction, a group including the materials may be classified as one grain. However, a border is formed between two grains having different orientations of a polycrystalline material and thus the two grains are classified as different grains, based on the border. Such a grain boundary tends to degrade electrical performance characteristics of the constituent semiconductor device.

Figure 11:
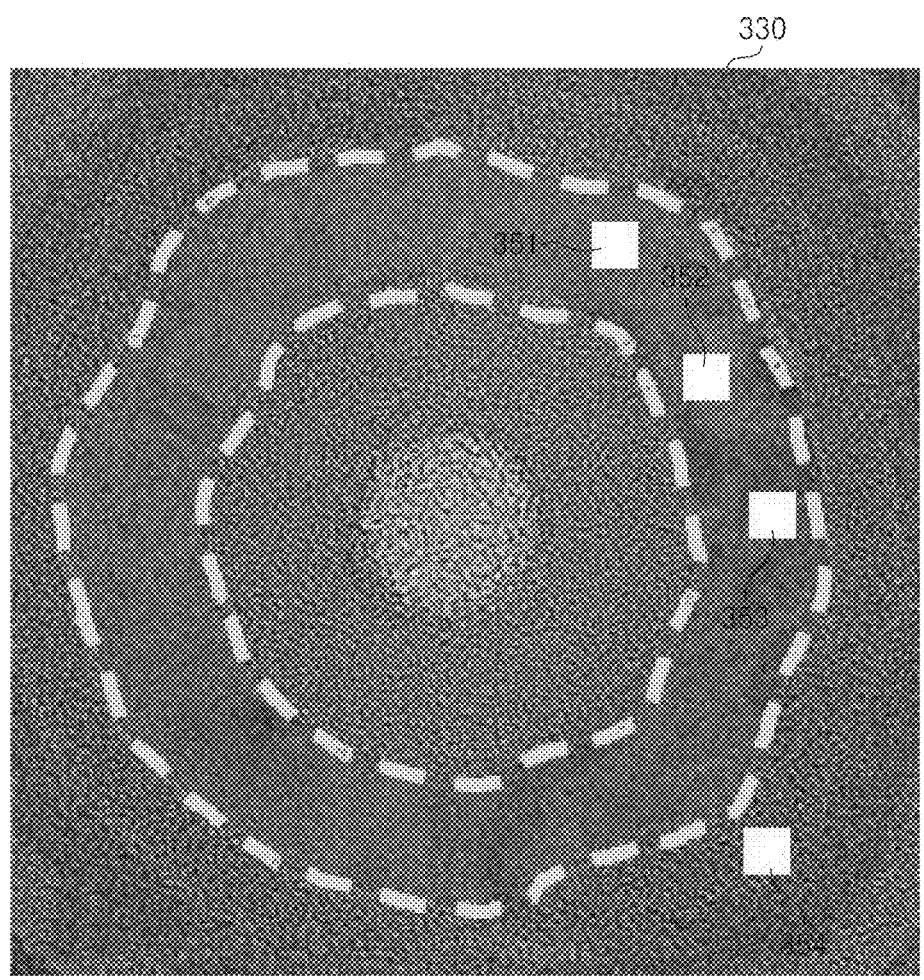
Figure 12:
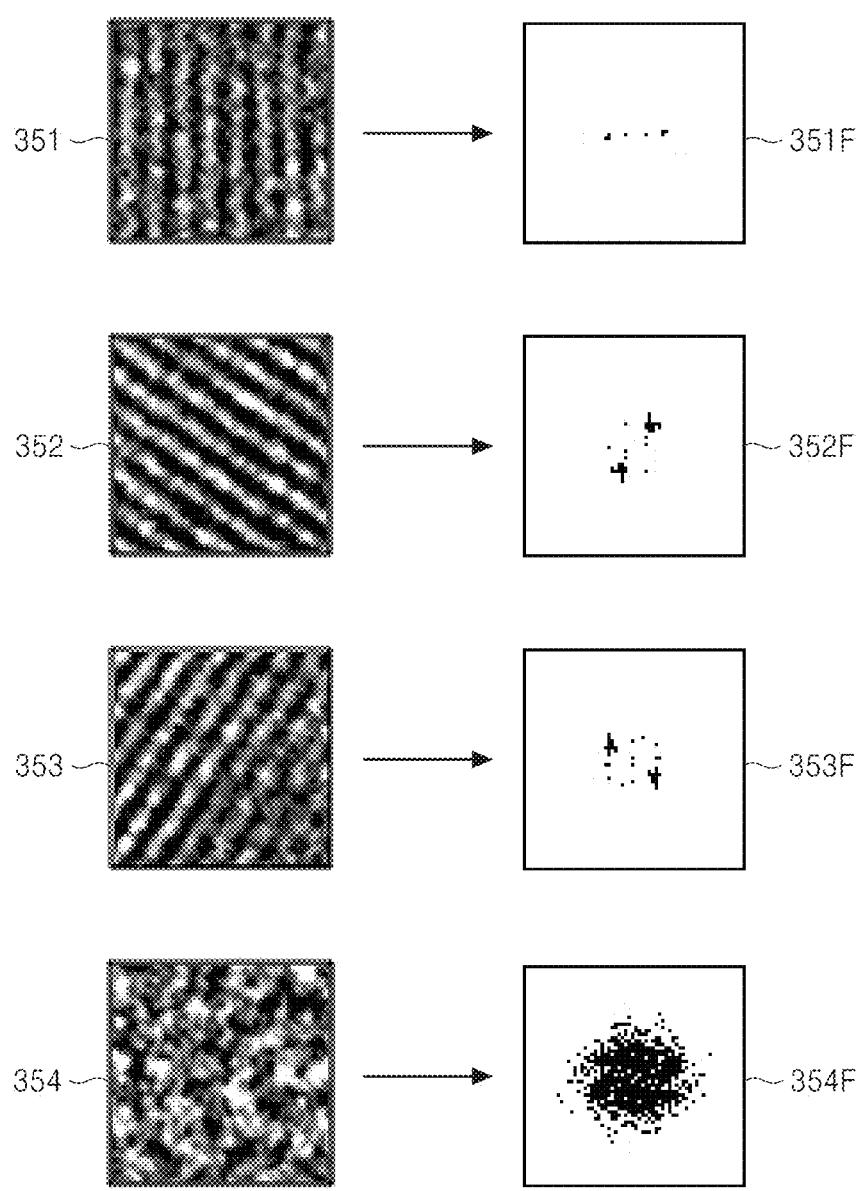

Referring back to FIG. 7, local windows each having a predetermined size are set for the HRTEM image 330 of FIG. 8 (operation S120). The image analyzing apparatus 10*a* or 10*b* calculates local transformation data, i.e., 2D FFT data, by performing 2D Fourier transformation on pixel data determined by the local windows (operation S130). FIG. 11 illustrates four local windows (hereinafter referred to as first to fourth local windows) 351, 352, 353, and 354 of the HRTEM image 330 of FIG. 8. FIG. 12 illustrates 2D FFT data 351F, 352F, 353, and 354 of the first to fourth local windows 351, 352, 353, and 354 of FIG. 11.

Referring to FIGS. 11 and 12, the 2D FFT data 351F, 352F, 353F, and 354F include a plurality of pieces of amplitude data which are two-dimensionally arranged around a midpoint. The 2D FFT data 351F, 352F, 353F, and 354F are symmetrical to one another with respect to the midpoint.

The image analyzing apparatus 10*a* or 10*b* calculates orientation information, a crystallization rate, and periodicity information of a grain, based on 2D FFT data (e.g., the 2D FFT data 351F, 352F, 353F, and 354F) (operation S140).

As described above, crystalline grains have periodicities that are in a specific range. For example, points that are symmetrical with respect to the midpoint (e.g., the 2D FFT data 351F, 352F, and 353F) are detected from FFT data of a crystalline grain.

In contrast, small points having a cloud shape, e.g., the 2D FFT data 354F, are detected from FFT data of an amorphous material.

Thus, material of a local window may be classified as grain (i.e., crystalline material) or non-grain (i.e., amorphous material) according to whether the periodicity information of FFT data thereof falls within a specific range.

When an amplitude of a peak value of 2D FFT data is comparatively low (e.g., when the amplitude of the peak value is less than a defined threshold), a crystallization rate is low. For example, when the amplitude of a peak value of the FFT data 352F of the second local window 352 is higher than that of a peak value of the FFT data 353F of the third local window 353, a crystallization rate of a grain of the second local window 352 is higher than that of a grain of the third local window 353.

Thus, a crystallization rate may be calculated from the amplitudes of peak values of the 2D FFT data 351F, 352F, 353F, and 354F of the local windows 351, 352, 353, and 354.

Grain segmentation (i.e., a classification of grains as the same grain or different grains) may be performed using direction-angle information. For example, when the difference between direction angles of the grains exceeds a threshold angle, the grains are classified as different grains.

After the grain segmentation is performed, the grains may be displayed using a color map (operations S160 and S165). For example, color information may be mapped to direction-angle information and brightness information may be mapped to amplitude information.

In one embodiment, operation S140 may include selecting a maximum point having a maximum amplitude from local transformation data, calculating orientation information based on a direction of the selected maximum point from a midpoint, and calculating periodicity information based on the distance between the midpoint and the selected maximum point.

Operations S120 to S150 described above are repeatedly performed from a first local window of one frame to a last local window thereof. Orientation, crystallization rate, and/or periodicity information for each grain as calculated for one local window may correspond to one or more pixel data included in the frame data of an HRTEM image. In this manner, operations S120 to S150 are performed to calculate orientation, crystallization rate, and/or periodicity information of each pixel of the frame data.

The above calculated information may be stored in the memory device 40 of FIG. 3.

The image analyzing apparatus 10*a* or 10*b* transforms the calculated orientation information, crystallization rate, and periodicity information of the grain into information to be displayed, i.e., into color information and gray-level information (operation S160).

In one embodiment, the orientation information of the grain may be converted into the color information, and the periodicity information or the crystallization rate of the grain may be converted into the gray-level information.

To this end, the image analyzing apparatus 10*a* or 10*b* may include a first mapping table for mapping the orientation information of the grain to the color information, and a second mapping table for mapping the crystallization rate of the grain to the gray-level information.

For example, the first mapping table may include R, G, and B values according to direction angles, and the second mapping table may include gray levels according to crystallization rates.

The information obtained in operation S160 may be displayed on a display device (operation S165).

Figure 13A:
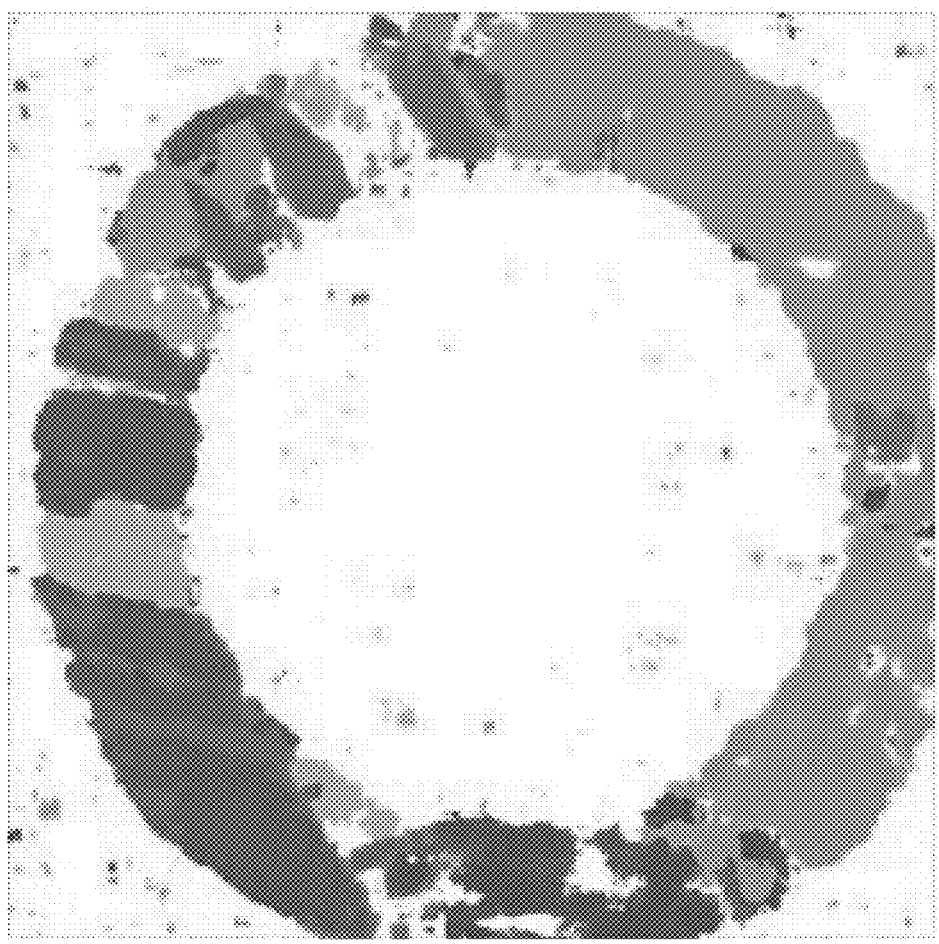
FIGS. 13A and 13B are mapped images that may be displayed on the display device of FIG. 1 according to embodiments of the inventive concept.
Figure 13B:
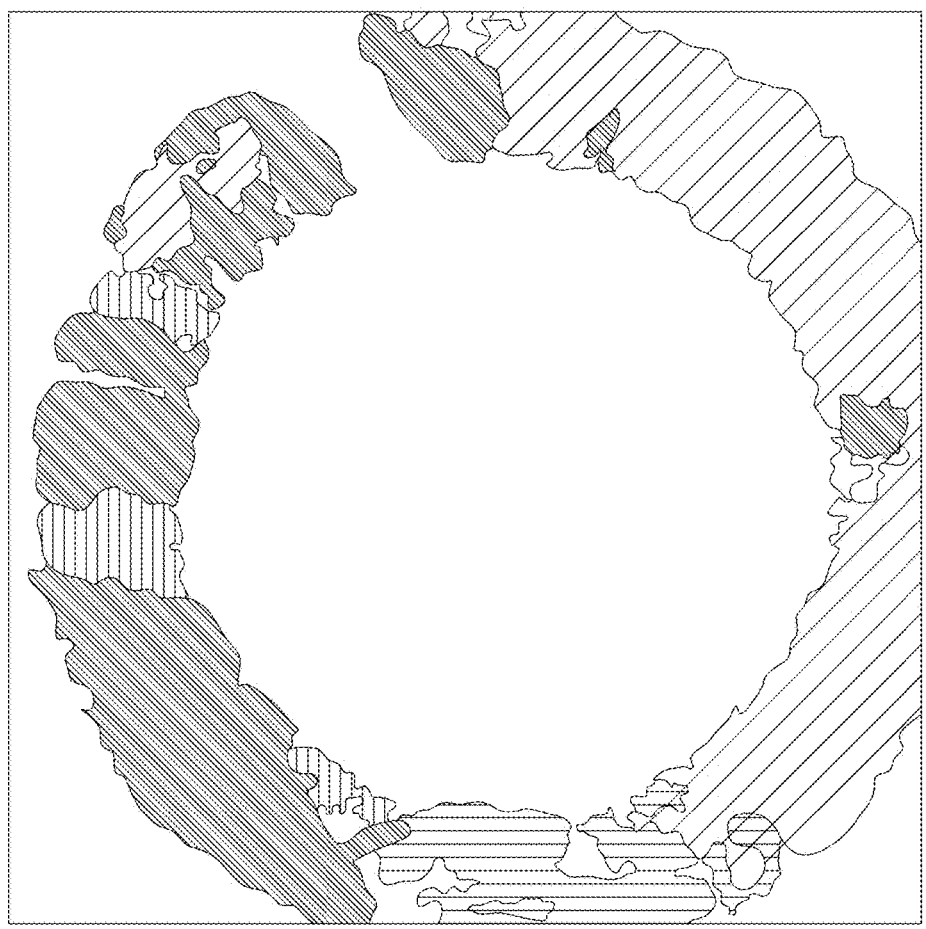

FIGS. 13A and 13B are exemplary mapped images that may be displayed on a display device according to embodiments of the inventive concept. FIG. 13A illustrates an image in which orientation information of a grain is mapped to color information and a crystallization rate of the grain is mapped to gray-level information. In FIG. 13A, a non-color region (a white region) denotes an amorphous material region and a color region denotes a crystalline material region (i.e., a grain region).

The grain region is segmented into grains according to the directions of the grains and the grains are mapped to different colors. The same grain mapped to the same color is displayed as having a different brightness (i.e., different gray levels) according to crystallization rates.

However, embodiments of the inventive concept are not limited thereto and various methods may be used to display information of an analyzed grain.

FIG. 13B illustrates an image in which different patterns are shown according to orientation information of grains.

The image analyzing apparatus 10a or 10b may determine a border between grains based on transformed information and calculate the sizes of the grains based on the border (operation S170).

For example, the image analyzing apparatus 10a or 10b may classify the grains into groups each including neighboring pixels having the same color, determine the groups as different grains, and determine the sizes of the grains by calculating the vertical and horizontal lengths or the areas of the grains.

The image analyzing apparatus 10a or 10b may calculate the number of grains according to the sizes of the grains (operation S170).

The number of grains calculated in operation S170 may be also displayed (operation S180). Statistical information such as the number of grains according to the sizes of the grains may be displayed in the form of graph or table.

Figure 14:
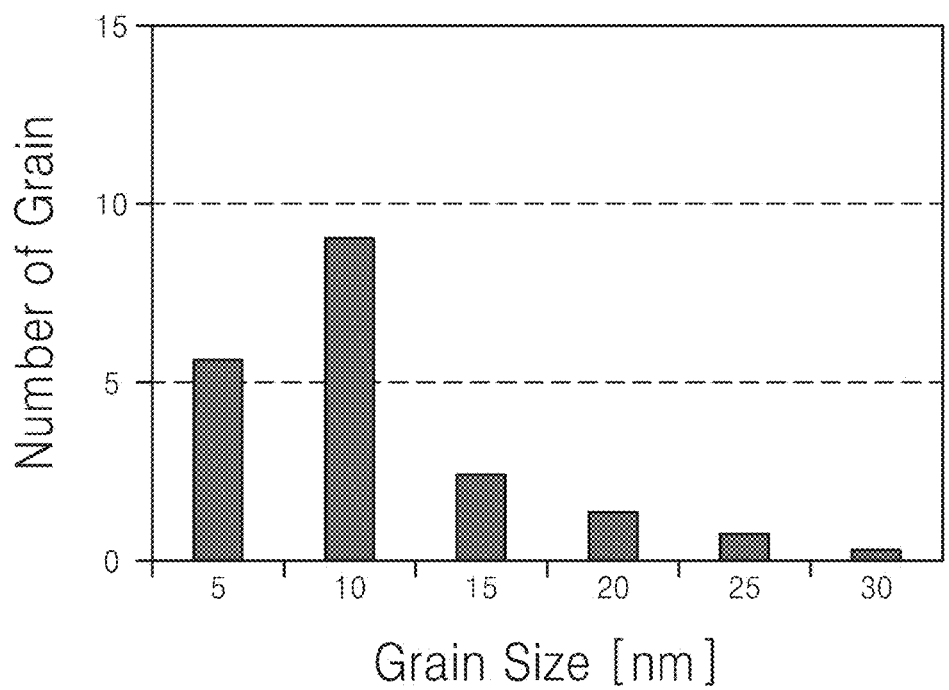
FIG. 14 is a graph illustrating a number of grains as a function of analyzed grain size.

FIG. 14 is a graph illustrating a number of grains as a function of grain sizes. As illustrated in FIG. 14, the number of grains according to the sizes thereof may be obtained by calculating the size of each of segmented grains and calculating the number of grains corresponding to each of the calculated sizes.

In the embodiment of FIG. 7, the image analyzing apparatus 10a or 10b determines a border between grains based on the color information or the gray-level information obtained in operation S160 and calculates the sizes of the grains based on the border. In another embodiment, the image analyzing apparatus 10a or 10b may classify the grains and calculate the sizes of the grains by setting borders between the grains based on orientation information, a crystallization rate, and periodicity information calculated for each local window.

For example, operation S170 of FIG. 7 may be performed before operation S160 is performed.

Figure 15:
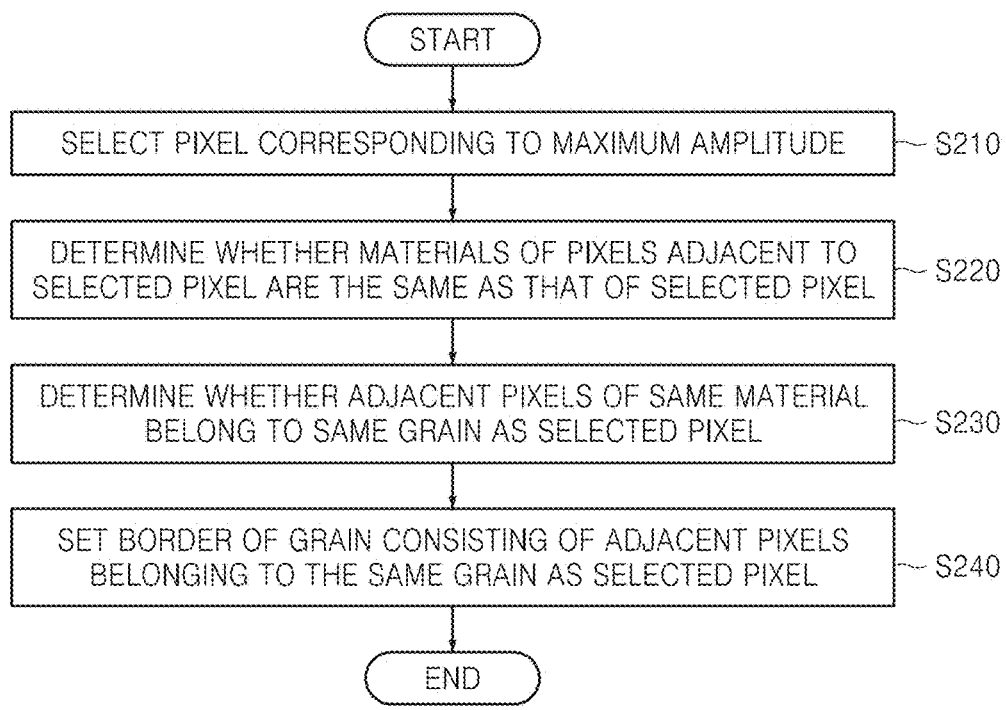
FIG. 15 is a flowchart summarizing a grain analyzing method according to another embodiment of the inventive concept.

FIG. 15 is a flowchart of a grain analyzing method according to another embodiment of the inventive concept. It is assumed in the embodiment of FIG. 15 that orientation information, a crystallization rate, and periodicity information are calculated for each pixel of a frame image.

For example, according to the present embodiment, before operation S210 is performed, the orientation information, the crystallization rate, and the periodicity information of each pixel of the frame image are calculated and stored in a memory.

Referring to FIG. 15, the image analyzing apparatus 10a or 10b selects a first pixel having a highest crystallization rate, i.e., the first pixel having a maximum amplitude, among a plurality of pixels of a frame image (operation S210).

Next, the image analyzing apparatus 10a or 10b determines whether materials of pixels adjacent to the first pixel are the same as that of the first pixel (operation S220).

Whether the materials of the pixels adjacent to the first pixel are the same as the material of the first pixel may be determined by determining whether the materials are crystalline materials or amorphous materials based on the periodicity information.

A range of the adjacent pixels may be set beforehand.

For example, the range of the adjacent pixels may be set to include 5×5 pixels, 7×7 pixels, etc. near the first pixel, but embodiments of the inventive concept are not limited thereto.

Pixels, the periodicity information of which is in a specific range among the pixels adjacent to the first pixel may be classified to correspond to a crystalline material and the other pixels, the periodicity information of which is not in the specific range among the pixels adjacent to the first pixel may be classified to correspond to an amorphous material.

Next, the image analyzing apparatus 10a or 10b determines whether pixels of the same material among the pixels adjacent to the first pixel belong to the same grain as the first pixel (operation S230).

Whether the pixels of the same material among the pixels adjacent to the first pixel belong to the same grain as the first pixel may be determined by determining whether direction angles of these pixels are in a predetermined range, based on a direction angle of the first pixel.

For example, if it is assumed that the direction angle of the first pixel is A1°, pixels each having a direction angle of A1°±5° or less among the pixels of the same material among the pixels adjacent to the first pixel may be classified to belong to the same grain as the first pixel.

Through the above process, a border of a grain consisting of the adjacent pixels belonging to the same grain as the first pixel (hereinafter referred to as a first grain) may be measured (operation S240). When the border of the first grain is measured, the size (the length, width, area, etc.) of the first grain may be calculated.

Operations S210 to S240 of FIG. 15 may be repeatedly performed.

The image analyzing apparatus 10a or 10b may select a second pixel having a highest crystallization rate among pixels that do not belong to the calculated first grain among pixels of the frame image (operation S210), determine whether pixels adjacent to the second pixel are of the same material (operation S220), and determine whether pixels of the same material among the pixels adjacent to the second pixel belong to the same grain as the second pixel (operation S230).

Through the above process, a border of a grain consisting of the adjacent pixels belonging to the same grain as the second pixel (hereinafter referred to as a second grain) may be measured (operation S240). When the border of the second grain is measured, the size (the length, width, area, etc.) of the second grain may be calculated.

Operations S210 to S240 of FIG. 15 may be repeatedly performed until classification of materials and grains of all of the pixels of the frame data are ended.

The present general inventive concept can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

According to an embodiment of the inventive concept, various properties (the size, distribution, material, orientation, etc.) of a nanometer polycrystal may be rapidly and precisely analyzed by performing Digital Fourier Transform (DFT) on an HRTEM image and extracting orientation information, a crystallization rate, periodicity information, etc. of the polycrystal from data obtained by performing DFT. Thus, costs and a time needed to analyze operating characteristics of a semiconductor device containing a material consisting of nanometer grains, such as polysilicon or a metal, may be decreased when the semiconductor device is developed, thereby shortening the speed of developing a product.

While the inventive concept has been particularly shown and described with reference to embodiments thereof, it will be understood that various changes in form and details may be made therein without departing from the scope of the following claims.

What is claimed is:

1. A method of analyzing a nanometer-sized grain, the method comprising:
   receiving a high-resolution transmission electron microscopy (HRTEM) image;
   setting a local window for the HRTEM image to define pixel data;
   performing at least one Fast Fourier Transformation (FFT) on the pixel data to calculate local transformation data; and
   analyzing the grain based on the local transformation data.

2. The method of claim 1, wherein the performing of the FFT comprises performing a two-dimensional (2D) Digital Fourier Transform (DFT) on the pixel data.

3. The method of claim 1, wherein the analyzing of the grain comprises calculating at least one of orientation information, crystallization rate information, and periodicity information for the grain.

4. The method of claim 3, wherein the calculating of the at least one of the orientation information, crystallization rate information, and periodicity information for the grain comprises:
   selecting data having a maximum amplitude from the local transformation data;
   calculating the orientation information based on a direction of the selected data from a midpoint; and
   calculating the periodicity information based on a distance between the midpoint and the selected data.

5. The method of claim 4, wherein the analyzing of the grain further comprises:
   determining whether the grain is a crystalline material or an amorphous material based on the periodicity information.

6. The method of claim 4, further comprising:
   storing the at least one orientation information, crystallization rate information, and periodicity information for each pixel of the HRTEM image in a memory.

7. A method of analyzing nanometer-sized grains including a first grain and a second grain, the method comprising:
   calculating grain analysis data for each pixel of a high-resolution transmission electron microscopy (HRTEM) image; and
   segmenting the first grain from the second grain based on the grain analysis data,
   wherein the grain analysis data comprises at least one of orientation information, crystallization rate information, and periodicity information for the first grain and the second grain.

8. The method of claim 7, wherein the calculating of the grain analysis data comprises:
   calculating Fast Fourier Transformation (FFT) data by performing at least one FFT on pixel data of the HRTEM image to generate FFT data; and
   calculating the at least one of the orientation information, crystallization rate information, and periodicity information for each pixel of the pixel data based on the FFT data.

9. The method of claim 7, wherein the segmenting of the first grain from the second grain comprises:
   selecting a first pixel having a highest crystallization rate based on the grain analysis data for each pixel of pixel data of the HRTEM image;
   determining whether pixels adjacent to the first pixel are of the same material;
   determining whether pixels of the same material among the pixels adjacent to the first pixel belong to the same grain as the first pixel; and
   setting a border of the first grain to include the adjacent pixels belonging to the same grain as the first pixel.

10. The method of claim 9, wherein the determining of whether pixels adjacent to the first pixel are of the same material comprises; determining whether the first pixel and the pixels adjacent to the first pixel are crystalline material or amorphous material based on the periodicity information.

11. The method of claim 9, wherein the determining of whether pixels of the same material among the pixels adjacent to the first pixel belong to the same grain as the first pixel comprises; determining that the first pixel and the pixels adjacent to the first pixel have respectively corresponding orientation information that falls within an expected range.

12. The method of claim 9, wherein the segmenting of the first grain from the second grain further comprises:
    selecting the second pixel having a highest crystallization rate among pixels that do not belong to the first grain based on the grain analysis data;
    determining whether pixels adjacent to the second pixel are of the same material;
    determining whether pixels of the same material among the pixels adjacent to the second pixel belong to the same grain as the second pixel; and
    setting a border of the second grain to include the adjacent pixels belonging to the same grain as the second pixel.

13. The method of claim 7, further comprising:
    mapping at least one of the orientation information and crystallization rate information for the first grain and second grain into corresponding color information and gray-level information, respectively to generate mapped data; and
    displaying the mapped data.

14. A system for analyzing nanometer-sized grains, the system comprising:
    a high-resolution transmission electron microscopy (HRTEM) image analyzing apparatus configured to receive an input image (IIM) for the HRTEM image, divide the TIM into local windows, perform at least one Fast Fourier Transformation (FFT) pixel data selected by the local windows to obtain FFT data to generate local transformation data, analyze grains based on the local transformation data to generate grain analysis data, and generate an output image (OIM) derived from the grain analysis data; and
    a display device configured to display at least one image in response to the OIM.

15. The system of claim 14, wherein the image analyzing apparatus comprises:
    a local window setting unit configured to set the local windows for a frame of the IIM;
    an FFT processor configured to calculate the local transformation data by performing two-dimensional (2D) FFT on pixel data respectively determined by the local windows; and
    an analyzing unit configured to calculate orientation information, crystallization rate information, and periodicity information for grains associated with each one of the local windows based on the local transformation data.

16. The system of claim 15, wherein the analyzing unit selects pixel data having a maximum amplitude from the local transformation data, calculates the orientation information based on a direction of the selected pixel data from a midpoint, and calculates the periodicity information based on a distance between the midpoint and the selected data.

17. The system of claim 16, wherein the analyzing unit determines whether the grains are crystalline material or amorphous material based on the periodicity information, and determines whether the grains are the same material based on the orientation information.

18. The system of claim 16, wherein the analyzing unit correlates orientation information, crystallization rate information, and periodicity information for each of the grains in relation to pixel data of at least one the local windows.

19. The system of claim 18, wherein the analyzing unit selects a first pixel having a highest crystallization rate among the pixels, determines whether pixels adjacent to the first pixel are of the same material, determines whether pixels of the same material among the pixels adjacent to the first pixel belong to the same grain as the first pixel, and sets a border of a first grain including the adjacent pixels belonging to the same grain as the first pixel.

20. The system of claim 15, wherein the image analyzing apparatus further comprises; a mapping unit configured to generate color information from orientation information and generate gray-level information from the crystallization rate information.

* * * * *